Oct. 7, 1958   C. N. DRUMMOND   2,855,022
SPLICING MACHINE
Filed Jan. 10, 1956   2 Sheets-Sheet 1

INVENTOR
CARL NORMAN DRUMMOND

BY *Lynn Barrett Morris*
ATTORNEY

Oct. 7, 1958     C. N. DRUMMOND     2,855,022
SPLICING MACHINE
Filed Jan. 10, 1956     2 Sheets-Sheet 2
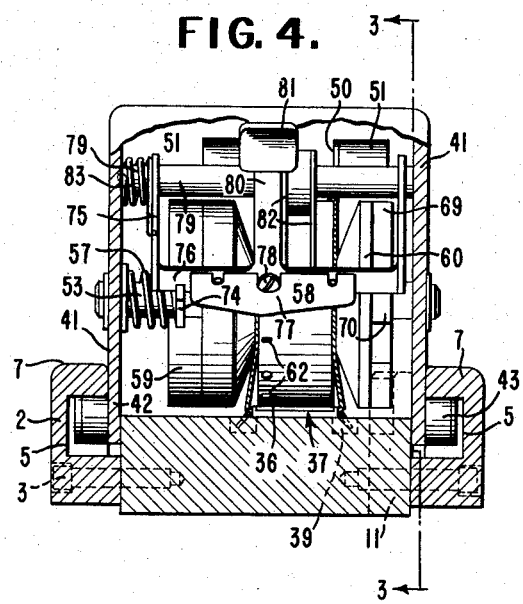
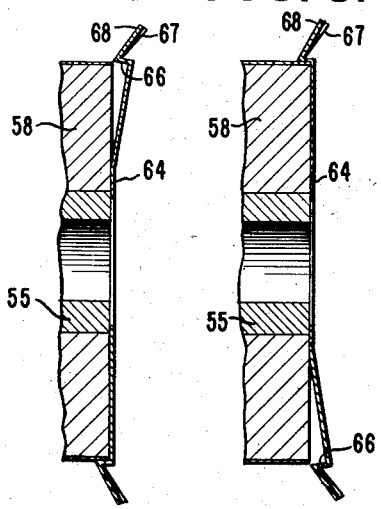
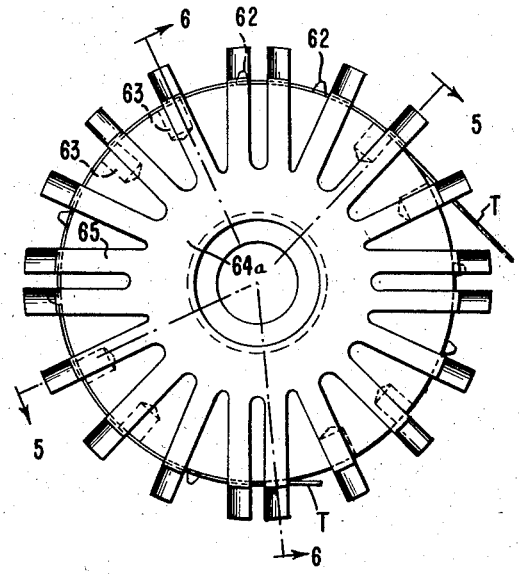
INVENTOR
CARL NORMAN DRUMMOND
ATTORNEY

United States Patent Office 2,855,022
Patented Oct. 7, 1958

2,855,022

SPLICING MACHINE

Carl Norman Drummond, South River, N. J., assignor to E. I. du Pont de Nemours and Company, Wilmington, Del., a corporation of Delaware Application January 10, 1956, Serial No. 558,363

16 Claims. (Cl. 154—42.1)

This invention relates to a splicing machine and more particularly to a machine for splicing perforated strips, films, foils, tapes and the like. Still more particularly it relates to a machine for splicing perforated motion picture film and sound recording film with a similarly perforated tape having a layer of pressure-sensitive adhesive material. The invention further relates to a tape dispensing unit and means for releasably holding the pressure-sensitive tape on a tape-feeding sprocket wheel.

An object of this invention is to provide a machine for rapidly slicing perforated motion picture film, sound recording film and similarly perforated films. Another object is to provide such a machine which is simple in construction and dependable in operation. Yet another object is to provide such a machine which is relatively economical to make and has a minimum of moving parts. A further object is to prvide such a machine which accurately registers a perforated splicing tape with overlapping or abutting sections of perforated motion picture or sound recording film to be spliced. A still further object is to provide a splicing machine particularly adapted for splicing relatively narrow films with perforations along only one side of the film. A more specific object is to provide a tape dispensing machine having a tape feeding sprocket wheel coacting with an automatically releasable tape retaining member. Still other objects will be apparent from the following description of the invention.

A perforated tape splicing machine of this invention will now be described with reference to the accompanying drawing which constitutes part of the present application. Referring now to the drawing, wherein the same reference numerals refer to the same parts throughout the several views:

Fig. 4 is a vertical sectional view of the dispenser unit disposed on the base unit taken along the line 4—4 of Fig. 3 with parts in elevation and broken section;

Fig. 5 is a sectional elevation taken on line 5—5 of Fig. 7;

Fig. 6 is a sectional elevation taken on line 6—6 of Fig. 7; and

Fig. 7 is an elevation view of the center sprocket coupled with the tape retaining member.

Figure 1:
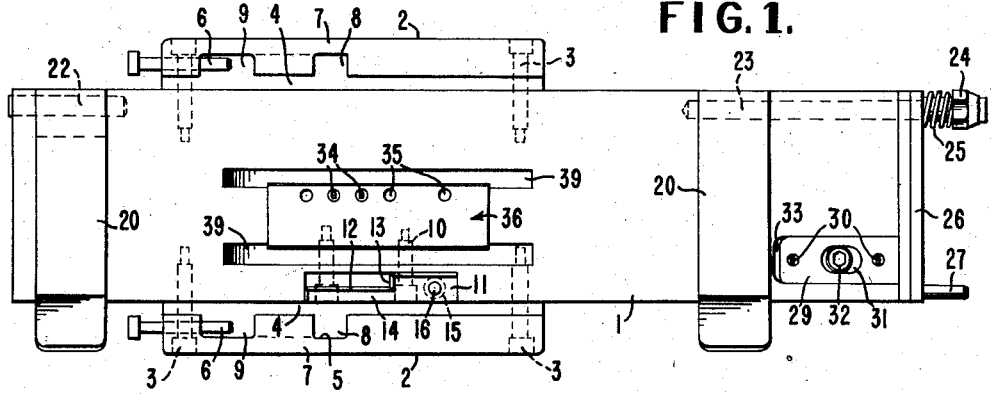
Fig. 1 is a plan view of the base unit of the splicing machine.

The base unit comprises a bedplate 1 having a side rail 2 fastened to each of its sides by means of screws 3. The space 4 between the inner wall 5 of each side rail and the side of the bedplate provides space for the roller guides on the dispenser casing (later described). Space 4 is essentially rectangular in shape but has an adjustable stop 6 near one end, which stop may be a screw threadably secured in the end of the side rail, as shown in Fig. 1. Guide plates 7, which may be integral with side rails 2 as shown in Fig. 4, are fastened to the upper surface of the guide rails. If the guide plates are separate pieces, they may be fastened to the upper surfaces of the guide rails by suitable means, e. g., screws. Each guide plate has two lateral guideways 8 and 9, as shown in Fig. 1. Guideway 9 is provided by positioning the guide plate relative to stop 6. Adjacent the guide plate and attached to a side of the bedplate by means of screws 10 is a combined thrust plate and radial stop-block 11, having a projecting portion 12 provided with a shoulder 13, an upper surface 14, and a recess 15. Fitted into recess 15 is a plunger 16 having a central collar portion 17. A spring 18, which is held in place by means of a set screw 19, surrounds the lower part of the plunger and forces it upwards.

Between the ends of the side rails and the ends of the bedplate are film clamps 20 which are hinged at one end and are provided at the other end with a spring latch 21. One of the clamps is mounted on hinge pin 22 and the other on an elongated hinge pin 23 which extends beyond the end of the bedplate and has an enlarged end or head 24. Spring 25 surrounds this pin and presses against the head and knife 26 pivoted on hinge pin 23. Upon actuating the knife by means of handle 27, the knife coacts with fixed cutter blade 28.

Near the fixed cutter blade is a small slidable plate 29 having registration pins 30 on its upper surface, which pins are adapted to interfit with perforations in a perforated motion picture film F or other perforated web to be spliced. The slidable plate is provided with a narrow slot 31 through which extends set-screw 32 for locking the slidable plate in adjusted position in recess 33 in the surface of the bedplate, the recess being wider than the slidable plate for such purpose. The cutter and slidable plate are provided for convenience in squaring up the ends of the perforated films to be spliced.

Figure 2:
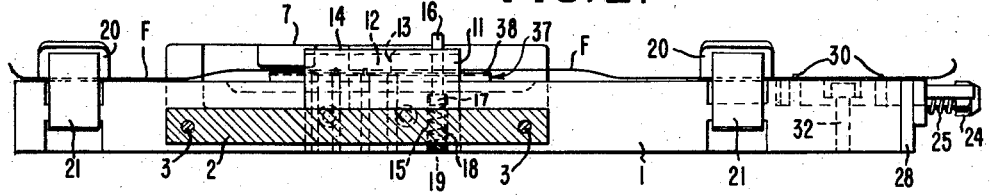
Fig. 2 is an elevation of the base unit with parts in section and with two strips of motion picture film in splicing position.
Figure 3:
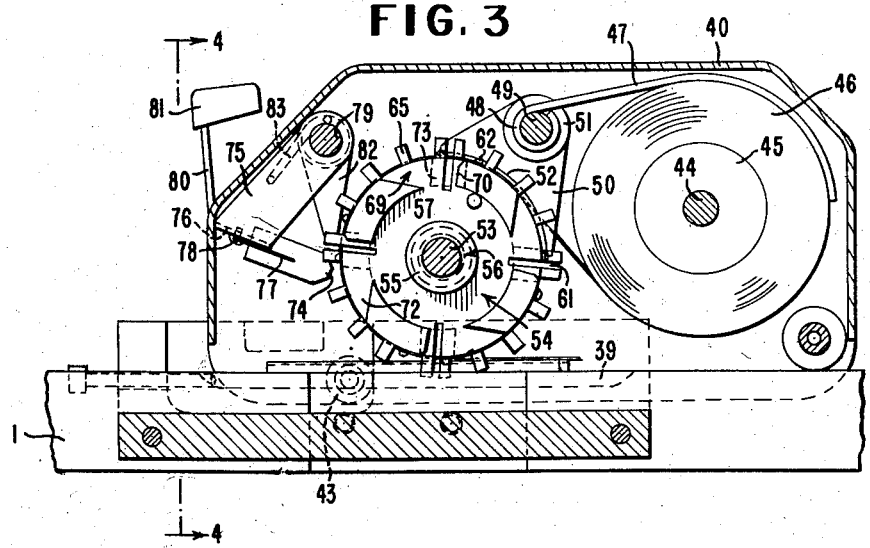
Fig. 3 is a sectional elevation taken on line 3—3 of Fig. 4 showing the dispenser unit disposed on the central portion of the base unit.

The upper surface of the bedplate (between the clamps 20 and adjacent the guide plates and thrust plate and stop-block) is provided with registration pins 34 and registration holes 35, which are aligned with the pins in a row. An elevated surface for the film splicing area is provided by pad 36 placed over the pins and holes. The pad may be of a resilient material formed in one piece or it may consist of a base portion 37 having on its surface a thin resilient layer or sheet 38, as shown in Fig. 2. Two recessed grooves or channels 39 are located in the upper surface of the bedplate, one on each side of pad 36, to permit passage of the tips 67 of the finger portions 65 of the tape-retaining member 64, as described below.

The tape dispensing unit or dispenser consists of an open-ended box-like casing 40 having side walls 41 which are provided with projecting stubshafts 42 on which there are rotatably mounted guide rollers 43.

Extending through and between side walls 41 there is an arbor 44 on which is mounted the core 45 of a roll 46 of perforated pressure-sensitive tape. Drag plate 47 presses against the roll and its sleeved end 48 is pivotally mounted on shaft 49 which also extends through and between the side walls of the casing. If desired, the frictional drag of the pivoted dragplate can be increased by the addition of a torsion or other spring (not shown).

Also mounted on shaft 49 are two tape retaining member tip guides 50 which may be adjustably fastened to the shaft by any suitable means, e. g., a collar 51 attached to each tip guide having a hole in the collar for receiving a set-screw (not shown). Each tip guide is in the form of a triangular sheet having the side of the triangle nearest the sprocket wheel curved convexly to follow the curve of the periphery of the sprocket wheel 54, described below. One tip guide is located at each side of the center sprocket 58 to provide a camming contact surface 52 to press the finger portions 65 of the tape retaining member 64 aside to permit the smooth uninterrupted feed of the pressure-sensitive tape T onto the sprocket, in the manner stated below.

Revolubly mounted on shaft 53, the ends of which are disposed in the side walls of the casing, is a tape feeding sprocket wheel 54 having a bushing 55. One end of this sprocket wheel is provided with a socket 56. Spring 57, surrounding shaft 53, fits into this socket and forces the sprocket wheel sidewise into firm contact with the thrust plate 11. For ease of construction sprocket wheel 54 is constructed of three sprocket sections, namely, a center sprocket 58 and two end sprockets 59 and 60, all of which are axially aligned with each other and mounted on shaft 53. The surface of each of the sprocket sections is divided into segments (four in the sprocket shown) by means of longitudinal slots 61. The surface of the center sprocket 58 between each slot and near at least one peripheral edge is provided with registration means consisting of a row of registration pins and holes. In the particular center sprocket shown, the row consists of a pin 62, two holes 63 and then another pin.

Located at each side of the center sprocket 58 and likewise mounted on shaft 53 is a tape-retaining member having finger portions 65 extending radially outward from a central hub 64a. At the outer extremities the finger portions bend at an angle of 90° toward the center sprocket forming a short flat surface 66 which coacts with the surface of the center sprocket to hold the pressure-sensitive tape T firmly on the center sprocket. At the inner end of flat surface 66 the finger portions are bent outwardly at an acute angle to the plane of the flat surface and terminate in tip 67 which may be slightly curved in a smooth arc to form camming surface 68 as shown most clearly in Figs. 5 and 6. The radially extending fingers of the tape retaining member need not be disposed symmetrically about the central hub but can be at varied spacing from each other with some or all fingers slightly skew from an exact radial position. This skew position may be particularly desirable for the fingers next adjacent each side of longitudinal slots 61, as illustrated in Fig. 7, to provide firm retention for the tape near each slot where there is a tendency for the tape to be pulled away from the sprocket as the cutter blade 77 withdraws from the slot after cutting the tape, as described below.

The tape retaining member, which is most conveniently constructed in one piece, is preferably made from a thin sheet of a light springy plastic or metal, e. g., a beryllium copper alloy or a spring steel alloy, by stamping, although it obviously may be formed by fastening together previously shaped component parts. It is also obvious that a single tape retaining member on one side only of the center sprocket would serve to hold the tape on the sprocket, but better retention is obtained with two retaining members, one on each side of the center sprocket. The tape retaining members are held firmly adjacent the center sprocket by the two end sprockets 59 and 60.

The end sprocket 60 which contacts with thrust plate 11 has cutaway wedge-shaped segments 69. The end walls 70 of these segments are straight and, with respect to the axis of the sprocket, are disposed in a radial direction, providing a flat surface 71 adapted to press against shoulder 13 on the combined thrust plate and radial stopblock. The latter, of course, can be made in two pieces but a single piece has obvious advantages. The face 72 of each wedge-shaped segment is preferably straight.

Longitudinal slots 61 terminate at one end in shallow radial slots 73 in end sprocket 59 which are adapted to receive the nose 74 on one side arm 75 of a tape cutter having cross arm 76 extending between each side arm. Cutter blade 77 is removably mounted on this arm and can be secured to the arm by means of screw 78. The outer ends of the side arms are pivotally mounted on shaft 79 extending between the casing walls and having its ends mounted in said walls. Key 80 attached to cross arm 76 extends through a suitable hole in the casing and is actuated by means of button 81. Also pivotally mounted on shaft 79 is a claw member 82, the outer ends of which are disposed close to the registration pins on the center sprocket and are adapted to help hold the perforated tape on the sprocket. A torsion spring 83 is also mounted on shaft 79 in such a manner that it forces the key in an upward direction. A similar torsion or other spring (not shown) may be provided to maintain pressure on the claw member to urge it towards the sprocket.

The operation of the tape splicing machine just described will now be explained. Two strips of motion picture film F or similarly perforated magnetic sound film to be spliced are placed on registration pins 30 and the ends cut by means of knife 26. The perforations in the pressure-sensitive tape should be of the same size and spacing as in the film to be spliced. However, they can be slightly larger or smaller in area. The ends of the films are then placed in abutting relation on registration pins 34, smoothed down and clamped in place with clamps 20. The tape dispenser unit which has the pressure-sensitive tape threaded on the registration pins on approximately two and one-half segments of the center tape feeding sprocket 58 is made ready for a splicing operation by depressing key 81, thereby actuating the tape cutter. When key 81 is depressed, cutter blade 77 severs the tape. At the same time nose 74 engages the surface of the cutaway wedge shaped segments of the end sprockets bringing the sprocket wheel into proper alignment for the splicing operation. The dispenser casing is then positioned on the base by inserting guide rollers 43 through guideway 8, the registration pins and holes of the center sprocket automatically registering with the pins and holes on the base. Due to the action of the nose member and plunger 16, the end wall 70 of the wedge-shaped segment 69 will be pressed against shoulder 13 on the combined thrust plate and radial stopblock. At the same time, spring 57 presses the sprocket 54 sidewise so that it is held against the thrust plate. The casing is then pushed forward in a horizontal direction until the guide roller strikes stop 6.

During the forward movement, the sprocket and attached tape retaining members 64 rotate, causing the tips 67 of the finger portions 65 to be smoothly cammed away from the center sprocket 58 by the protruding corners of elevated pad 36 contacting the camming surfaces 68. The camming action commences as each finger portion approaches the lower part of its path of rotation, and, at its extreme bottom position, flat surface 66 of the finger portions has been completely and automatically displaced from its retaining position on tape T, thus permitting free and direct removal of the tape from the sprocket, as illustrated in Figs. 4 and 6. It can be seen in Fig. 4 that tips 67 pass freely through the recessed grooves or channels 39 in the bedplate when cammed into the non-retaining position just described, and the springy, resilient quality of the tape retaining member causes the fingers to resume automatically their retaining position after leaving contact with the pad 36. The tape T is fed without obstruction onto the center sprocket by a similar camming automatic action wherein the contact surface 52 on each tip guide 50 forces the finger tips temporarily out of retaining position until they have passed the guide, as illustrated in Fig. 5.

When the forward motion of the dispenser is arrested by stop 6, the splicing operation is completed. During this operation, the strip of perforated tape T which was on the segment of the sprocket wheel feeds off and becomes firmly attached to the adjoining strips of perforated motion picture film or sound recording tape F which were positioned on the base plate. The dispenser is then lifted and the guide rollers passed through guideway 9. The clamps are opened and the spliced film is lifted from the registration pins. If desired, the film can be turned over and again positioned on the registration pins, the clamps applied and the splicing operation repeated, thereby obtaining a splice with splicing tape applied to both surfaces of the adjoining ends of the film element. If necessary, the splice can be smoothed with the finger or a suitable instrument to remove any bubbles which might be formed during the splicing operation.

The invention is not limited to the specific device illustrated in the drawing, as obviously many changes in various details can be made. For example, instead of using a four-segment sprocket wheel, two, three, five or more segments can be used. The size of the sprocket and the length of tape to be applied to an extent will determine the number of segments.

The dispenser casing is preferably closed on the top, sides and ends and can be made in one piece as, e. g., by die casting or stamping, or several pieces can be welded or fastened together by screws or other suitable means. If desired, a slide or end plate can be made removable so that a new roll of pressure-sensitive tape can be introduced. The various shafts can be held in the dispenser casing walls by a force fit, swaged ends, set screws, spring rings, or by other suitable means.

The size and shape of the guide plates can be varied to fit the particular type of guides on the casing.

Various types of clamps can be used in place of the particular type shown and they can be hinged and locked in position in any suitable manner.

The registration pins both on the sprocket and bedplate should be accurately made so that the perforations in the films to be spliced and the perforations in the pressure-sensitive tape fit snugly at the base of the pins for accurate registration in the splicing operation. For ease in applying the perforated films and pressure-sensitive tape, the pins are tapered or chamfered for a short distance from their outer extremities.

If the splicing device is to be used for the splicing of magnetic sound tape, the use of magnetic materials in either unit should be avoided. Brass, aluminum alloys and other non-magnetic alloys or metals can be used. In order to have a durable strong construction, it is desirable to have the main parts made of metals, but plastic materials, e. g., nylon, hard rubber, etc., can be used for certain parts.

The novel tape retaining members may have any suitable number of fingers and flat retaining surfaces. The actual number will depend on the size of the sprocket, the size of each flat surface on each finger, and the width of the tape. The camming surface which pushes the tips out of retaining position for releasing the tape from the sprocket wheel can be a protruding corner of the pad, as described above, or it can be a separate member fastened to the bedplate, and provided specifically for the camming purpose. The camming surface which pushes the tips out of retaining position for feeding the tape onto the sprocket likewise can obviously be of any suitable structure which may, for example, be fastened directly to the side walls of the casing instead of to the shaft as described. The camming surface of the guides may be rounded or curved slightly away from the sprocket to provide a smoother, more gradual camming contact with the finger tips.

The device described above obviously can be modified in various ways if desired and still contain the essential operating parts. The tape dispensing unit can be used with different types of bases with modified guideways, etc. While the construction shown is for motion picture film perforated along only one edge, by providing registration pins and holes in a second row along the other side of the sprocket wheel and base, the device can be used to splice cine film having perforations along both edges.

The perforated tapes useful in the invention may consist of a base of any strong transparent material such as a cellulose derivative, e. g., cellulose acetate, cellulose propionate; or regenerated cellulose, e. g., cellophane or a superpolymer, e. g., polystyrene, polyvinyl chloride, poly(vinylchloride covinylacetate), nylon, polyethylene terephthalate or vinylidene chloride copolymer. Any of the usual tacky adhesives are useful for the pressure-sensitive adhesive layer. Suitable adhesives are described in Drew U. S. Patent 2,177,627.

The tape splicing machine of this invention is not only useful in splicing abutting or overlapping strips of a perforated web, e. g., film, but it can be used to mend a web which has been split, cracked, torn, etc.

The novel releasable tape retaining feature of this invention is particularly adapted for inclusion with the splicing machines claimed in Fritzinger U. S. application Serial No. 503,385, filed April 25, 1955, now Patent No. 2,794,488, and in Spencer U. S. application Serial No. 523,329, filed July 20, 1955, now Patent No. 2,794,490. However, it is obvious that the tape retaining feature can be usefully associated with a tape feeding or dispensing sprocket, drum, wheel, or roller in various mechanical devices, e. g., gummed tape dispensers, tape applicator machines, labelling machines, stamp dispensing machines, etc. It is also obvious that, although illustrated herein for use with perforated tape and a sprocket wheel having registration pins and holes, the novel tape retaining feature can be of similar utility in dispensing or in splicing or repairing with a non-perforated pressure-sensitive tape.

The tape splicing machine of this invention has the advantages that it eliminates the use of solvent cements and the scraping of emulsions from the films. Another advantage is that strong splices can be readily obtained in dimly lighted rooms. Yet another advantage is that the device is easy to operate and gives dependable results over long periods of time. A further advantage is that one does not have to touch the tacky surface of the pressure-sensitive tape. A still further advantage is that the splicing machine has few moving parts and is easy to assemble. A still further advantage is that splices can be made in a very short time. An additional advantage is that excellent splices can be obtained on relatively narrow films having perforations along a single edge. Another advantage is that pressure-sensitive adhesive tape can be readily dispensed in a tape dispensing machine from a tape dispensing sprocket without adhesive contact between the tape and the sprocket with the added advantage of having the tape held securely on the sprocket until the tape is to be released at the desired position. Still further advantages will be apparent from the above description of the invention.

The invention claimed is:

1. A tape splicing machine comprising a bedplate, and a coacting tape dispenser unit comprising means for rotatably supporting a roll of pressure-sensitive tape, rotatable tape feeding means, and at least one annular means mounted coaxially with and adjacent said tape feeding means and rotatable and coacting therewith for releasably retaining said tape on said tape feeding means.

2. A tape splicing machine comprising a bedplate having registration pins for a perforated web to be spliced, and a coacting tape dispenser unit comprising means for rotatably supporting a roll of perforated pressure-sensitive tape, a rotatable tape feeding sprocket wheel, and at least one means for releasably retaining said tape on said sprocket wheel, said last-mentioned means comprising an annular hub and a plurality of essentially radially disposed, cam actuatable, tape retaining fingers having automatically releasable tape retaining surfaces coacting with said sprocket wheel at the periphery of said sprocket wheel.

3. A tape splicing machine comprising a bedplate having an elevated surface for a film splicing area, said elevated surface providing protruding camming corners and registration pins for a perforated web to be spliced, and a coacting tape dispenser unit comprising means for rotatably supporting a roll of perforated pressure-sensitive tape, a rotatable tape feeding sprocket wheel having at least one circumferential row of registration pins and holes, and means adjacent at least one side of said sprocket wheel for releasably retaining said tape on said sprocket wheel, said last-mentioned means comprising an annular hub mounted coaxially with said wheel and rotatable therewith and, integral with said hub, a plurality of essentially radially disposed, cam actuatable, tape retaining fingers each having a camming surface and a tape retaining surface coacting with said wheel, and at least one guide member providing a camming surface to move said retaining fingers out of tape retaining position, said guide member disposed adjacent where said tape feeds onto said sprocket wheel.

4. In a tape splicing machine having a bedplate with juxtaposed registration pins for a perforated film to be spliced, guideways, a thrust plate and a stock-block, a coacting tape dispenser having a casing with a top, side walls and at least one end wall, guides on the outside of said side walls, and containing a rotatable registration sprocket wheel, means for rotatably supporting a roll of perforated pressure-sensitive tape, said sprocket wheel having equally spaced radial slots dividing it into segments, each segment having at least one circumferential row of registration pins and holes, one end of said sprocket wheel having a radial stop in each segment, spring means for forcing said sprocket wheel in an axial direction and means for forcing said stop in a radial direction: the combination of means adjacent said sprocket wheel and rotatable therewith for releasably retaining said tape on said wheel.

5. In a tape splicing machine having a bed-plate with juxtaposed registration pins for a perforated film to be spliced, guideways, a thrust plate and a stop-block, a coacting tape dispenser having a casing with a top, side walls and at least one end wall, guides on the outside of said side walls, and containing a rotatable registration sprocket wheel, means for rotatably supporting a roll of perforated pressure-sensitive tape, said sprocket wheel having equally spaced radial slots dividing it into segments, each segment having at least one circumferential row of registration pins and holes, one end of said sprocket wheel having a radial stop in each segment, spring means for forcing said sprocket wheel in an axial direction and means for forcing said stop in a radial direction: the combination of at least one annular means mounted coaxially with and adjacent said sprocket wheel and rotatable and coacting therewith for releasably retaining said tape on said sprocket wheel.

6. In a tape splicing machine having a bed-plate with juxtaposed registration pins for a perforated film to be spliced, guideways, a thrust plate and a stop-block, a coacting tape dispenser having a casing with a top, side walls and at least one end wall, guides on the outside of said side walls, and containing a rotatable registration sprocket wheel, means for rotatably supporting a roll of perforated pressure-sensitive tape, said sprocket wheel having equally spaced radial slots dividing it into segments, each segment having at least one circumferential row of registration pins and holes, one end of said sprocket wheel having a radial stop in each segment, spring means for forcing said sprocket wheel in an axial direction and means for forcing said stop in a radial direction: the combination of at least one means for releasably retaining said tape on said sprocket wheel, said last-mentioned means comprising an annular hub and a plurality of essentially radially disposed, cam actuatable, tape retaining fingers having automatically releasable tape retaining surfaces coacting with said sprocket wheel at the periphery of said sprocket wheel.

7. A machine as set forth in claim 6 wherein said means for releasably retaining said tape on said sprocket wheel comprises a plurality of fingers whose extremities are bent over the periphery of said wheel for a short distance providing a tape retaining surface on each said finger on the side of said finger adjacent said periphery, and then bent backward and outward at an acute angle from the plane of said surface providing camming surfaces on said fingers on the side opposite from said periphery, said fingers composed of a thin resilient metal integral piece extending essentially radially from a common central hub.

8. In a tape splicing machine having a bed-plate with juxtaposed registration pins for a perforated film to be spliced, guideways, a thrust plate and a stop-block, a coacting tape dispenser having a casing with a top, side walls and at least one end wall, guides on the outside of said side walls, and containing a rotatable registration sprocket wheel, means for rotatably supporting a roll of perforated pressure-sensitive tape, said sprocket wheel having equally spaced radial slots dividing it into segments, each segment having at least one circumferential row of registration pins and holes, one end of said sprocket wheel having a radial stop in each segment, spring means for forcing said sprocket wheel in an axial direction and means for forcing said stop in a radial direction: the combination of at least one camming surface on said bedplate, and, in combination with said dispenser, a pair of means mounted one on each side of said sprocket wheel, said last mentioned means each comprising an annular hub mounted coaxially with said sprocket wheel and rotatable therewith, and, integral with said hub, a plurality of essentially radially disposed, cam actuatable, tape retaining fingers each having a camming surface and a tape retaining surface coacting with said sprocket wheel, and a pair of guide members each providing a camming surface to move said fingers out of tape retaining position, said guide members supported by a shaft in said casing and disposed with one of said guide members adjacent each periphery of said sprocket wheel where said tape feeds onto said wheel.

9. A machine as set forth in claim 8 wherein said bedplate and sprocket wheel are provided with one row of coating registration pins and registration holes.

10. A machine as set forth in claim 8 wherein said casing is provided with means for cutting pressure-sensitive tape on said wheel.

11. A machine as set forth in claim 10 wherein said tape cutting means is provided with means for guiding the cutter blade into said slots.

12. A tape dispenser unit comprising means for rotatably supporting a roll of perforated pressure-sensitive tape, a rotatable tape feeding sprocket wheel, and at least one means for releasably retaining said tape on said sprocket wheel, said last-mentioned means comprising an annular hub and a plurality of essentially radially disposed, cam actuatable, tape retaining fingers having automatically releasable tape retaining surfaces coacting with said sprocket wheel at the periphery of said wheel.

13. A tape dispenser unit comprising means for rotatably supporting a roll of perforated pressure-sensitive tape, a rotatable tape feeding sprocket wheel having at least one circumferential row of registration pins and holes, and means adjacent at least one side of said sprocket wheel for releasably retaining said tape on said sprocket wheel, said last-mentioned means comprising an annular hub mounted coaxially with said sprocket wheel and rotatable therewith and, integral with said hub, a plurality of essentially radially disposed, cam actuatable, tape retaining fingers each having a camming surface and a tape retaining surface coacting with said sprocket wheel, and at least one guide member providing a camming surface to move said retaining fingers out of tape retaining position, said guide member disposed adjacent where said tape feeds onto said sprocket wheel.

14. In a tape dispenser unit having a casing with a top, side walls and at least one end wall, guides on the outside of said side walls, and containing a rotatable registration sprocket wheel, means for rotatably supporting a roll of perforated pressure-sensitive tape, said sprocket wheel having equally spaced radial slots dividing it into segments, each segment having at least one circumferential row of registration pins and holes, one end of said sprocket wheel having a radial stop in each segment, spring means for forcing said sprocket wheel in an axial direction and means for forcing said stop in a radial direction: the combination which comprises means adjacent said sprocket wheel and rotatable therewith for releasably retaining said tape on said sprocket wheel.

15. In a tape dispenser unit having a casing with a top, side walls and at least one end wall, guides on the outside of said side walls, and containing a rotatable registration sprocket wheel, means for rotatably supporting a roll of perforated pressure-sensitive tape, said sprocket wheel having equally spaced radial slots dividing it into segments, each segment having at least one circumferential row of registration pins and holes, one end of said sprocket wheel having a radial stop in each segment, spring means for forcing said sprocket wheel in an axial direction and means for forcing said stop in a radial direction: the combination which comprises at least one means for releasably retaining said tape on said wheel, said last-mentioned means comprising an annular hub and a plurality of essentially radially disposed, cam actuatable, tape retaining fingers having automatically releasable tape retaining surfaces coacting with said sprocket wheel at the periphery of said wheel.

16. In a tape dispenser unit having a casing with a top, side walls and at least one end wall, guides on the outside of said side walls, and containing a rotatable registration sprocket wheel, means for rotatably supporting a roll of perforated pressure-sensitive tape, said sprocket wheel having equally spaced radial slots dividing it into segments, each segment having at least one circumferential row of registration pins and holes, one end of said sprocket wheel having a radial stop in each segment, spring means for forcing said sprocket wheel in an axial direction and means for forcing said stop in a radial direction: the combination which comprises a pair of means mounted one on each side of said sprocket wheel, said last mentioned means each comprising an annular hub mounted coaxially with said sprocket wheel and rotatable therewith, and integral with said hub, a plurality of essentially radially disposed, cam actuatable, tape retaining fingers each having a camming surface and a tape retaining surface coacting with said sprocket wheel, and a pair of guide members each providing a camming surface to move said fingers out of tape retaining position, said guide members supported by a shaft in said casing and disposed with one of said guide members adjacent each periphery of said sprocket wheel where said tape feeds onto said wheel.

References Cited in the file of this patent
FOREIGN PATENTS
297,576    Great Britain _____ Sept. 27, 1928